United States Patent
Kim

(10) Patent No.: US 9,539,991 B2
(45) Date of Patent: Jan. 10, 2017

(54) BRAKE APPARATUS OF VEHICLE AND METHOD THEREOF

(71) Applicants: Hyundai Motor Company, Seoul (KR); Kia Motors Corporation, Seoul (KR)

(72) Inventor: Sung Do Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/822,699

(22) Filed: Aug. 10, 2015

(65) Prior Publication Data

US 2016/0251004 A1    Sep. 1, 2016

(30) Foreign Application Priority Data

Feb. 26, 2015    (KR) .................. 10-2015-0027547

(51) Int. Cl.
- *B60T 8/24* (2006.01)
- *B60T 8/171* (2006.01)
- *B60T 8/1761* (2006.01)

(52) U.S. Cl.
CPC ............ *B60T 8/245* (2013.01); *B60T 8/171* (2013.01); *B60T 8/17616* (2013.01)

(58) Field of Classification Search
CPC ........ B60T 8/245; B60T 8/171; B60T 8/17616
See application file for complete search history.

(56) References Cited

U.S. PATENT DOCUMENTS

| | | | | |
|---|---|---|---|---|
| 5,718,446 | A * | 2/1998 | Fuchida | B60G 17/0164 280/124.157 |
| 2006/0195231 | A1* | 8/2006 | Diebold | B60R 21/013 701/1 |
| 2006/0253240 | A1* | 11/2006 | Rao | B60W 50/035 701/48 |
| 2007/0067085 | A1* | 3/2007 | Lu | B60T 8/172 701/70 |
| 2007/0106442 | A1* | 5/2007 | Lu | B60T 8/172 701/38 |
| 2010/0036557 | A1* | 2/2010 | Lu | B60T 8/172 701/38 |
| 2012/0078470 | A1* | 3/2012 | Hirao | B60G 17/08 701/38 |
| 2013/0116874 | A1* | 5/2013 | Ichinose | B60L 7/18 701/22 |

FOREIGN PATENT DOCUMENTS

| | | |
|---|---|---|
| JP | 6-72307 A | 3/1994 |
| JP | 2727907 B2 | 3/1998 |
| JP | 2007-30752 A | 2/2007 |
| JP | 2010-116061 A | 5/2010 |
| KR | 10-1260283 B1 | 5/2013 |

* cited by examiner

*Primary Examiner* — Russell Frejd
(74) *Attorney, Agent, or Firm* — Morgan, Lewis & Bockius LLP

(57) ABSTRACT

A brake apparatus of a vehicle may include a detector configured to detect driving information including an operation status of a brake pedal, a vehicle speed, and a vehicle deceleration, an anti-lock braking system (ABS) configured to control a braking force supplied to wheels of the vehicle by detecting slip generated at the wheels, and a controller configured to determine a braking status of the vehicle from the operation status of the brake pedal detected by the detector, the vehicle speed, and the vehicle deceleration, and configured to selectively perform ABS control or pitch motion control for reducing a pitch motion of the vehicle according to the braking status of the vehicle.

7 Claims, 5 Drawing Sheets

BRAKE APPARATUS OF VEHICLE AND METHOD THEREOF

CROSS-REFERENCE TO RELATED APPLICATION

The present application claims priority to Korean Patent Application No. 10-2015-0027547 filed Feb. 26, 2015, the entire contents of which is incorporated herein for all purposes by this reference.

BACKGROUND OF THE INVENTION

Field of the Invention

The present invention relates to a brake apparatus of a vehicle and a method thereof. More particularly, the present invention relates to a brake apparatus of a vehicle and a method that can reduce braking distance by minimizing a pitch motion generated when the vehicle quickly brakes.

Description of Related Art

Generally, in a hydraulic pressure brake system, a hydraulic brake pressure generated by operation of a brake pedal is supplied to each wheel, thereby a vehicle is braked. At this time, a slip between the tire and a road occurs when a braking force that is larger than a static friction force is supplied to a tire.

As is known, a dynamic friction coefficient is less than a static friction coefficient. In order to exhibit optimal brake effect, slipping between the tire and the road must be prevented. In addition, locking up of the brake during slipping must be prevented.

Thus, an antilock brake system (ABS) is used for preventing slip and locking up by controlling hydraulic brake pressure supplied to each wheel. The ABS includes a plurality of solenoid valves controlling the hydraulic brake pressure transmitted to each hydraulic pressure brake, an accumulator, an electric control unit (ECU) controlling a hydraulic pressure control apparatus, and electric/electronic devices such as a hydraulic pressure pump.

The ABS detects a slip generated by operation of a brake on a slippery road or during quick braking, and reduces, sustains, or increases the hydraulic brake pressure such that the vehicle can obtain optimal cornering force and stop at a shortest distance while maintaining steering stability.

Meanwhile, as shown in FIG. 1, since a mass center of a vehicle body is positioned at a higher position compared to a suspension, a pitch motion (in other words, a 'nosedive') in which a front portion of the vehicle body falls toward the ground is generated when a driver strongly presses a brake pedal for quick braking.

At this time, when the ABS is operated, a high hydraulic brake pressure is formed at driving wheels by a hydraulic pressure control apparatus, and braking distance becomes longer as the hydraulic brake pressure supplied to the driving wheels is reduced, thereby deceleration is reduced. Therefore, there is a problem that a braking distance becomes longer.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a brake apparatus and method that can prevent braking distance from increasing by a pitch motion generated when quickly braking a vehicle.

According to various aspects of the present invention, a brake apparatus of a vehicle may include a detector configured to detect driving information including an operation status of a brake pedal, a vehicle speed, and a vehicle deceleration, an anti-lock braking system (ABS) configured to control a braking force supplied to wheels of the vehicle by detecting slip generated at the wheels, and a controller configured to determine a braking status of the vehicle from the operation status of the brake pedal detected by the detector, the vehicle speed, and the vehicle deceleration, and configured to selectively perform ABS control or pitch motion control for reducing a pitch motion of the vehicle according to the braking status of the vehicle.

The controller may be configured to perform the pitch motion control when the vehicle deceleration detected by the detector is greater than a predetermined deceleration, and a pitch coefficient determined by the vehicle speed and a variation of the vehicle deceleration is greater than a first predetermined value.

The controller may be configured to stop the pitch motion control when the pitch coefficient is less than a second predetermined value, and performs the ABS control.

The pitch motion control may gradationally increase the braking force supplied to the wheels according to the pitch coefficient after supplying the braking force to the wheels for a period of time.

According to various aspects of the present invention, a braking method of a vehicle may include determining, by a controller, whether the vehicle brakes, determining, by the controller, whether the vehicle quickly brakes, determining, by the controller, a pitch coefficient from a vehicle speed and a vehicle deceleration, determining, by the controller, whether the vehicle quickly brakes and whether the pitch coefficient is greater than a predetermined value, and performing, by the controller, pitch motion control in which a predetermined braking force is supplied to the wheel for a predetermined time and the braking force is increased step-by-step when the vehicle quickly brakes and when the pitch coefficient is greater than the predetermined value.

It may be determined that the vehicle quickly brakes when the vehicle deceleration is greater than a predetermined deceleration.

The pitch coefficient may be stored as map data according to the vehicle speed and the vehicle deceleration.

The pitch motion control may be stopped and ABS control may be performed when the pitch coefficient is less than a second predetermined value.

According to various embodiments of the present invention, it is possible to minimize a braking distance of a vehicle by pitch motion control for minimizing the pitch motion when quickly braking a vehicle.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
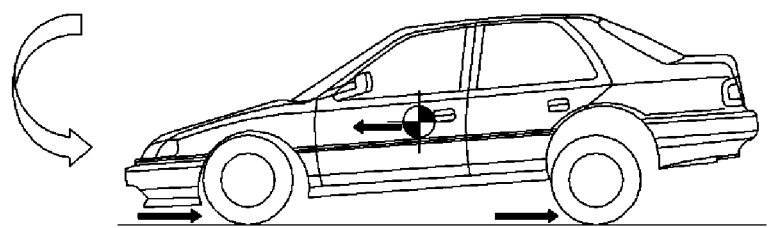
FIG. 1 is a schematic view illustrating a pitch motion generated when a vehicle quickly brakes.
Figure 2:
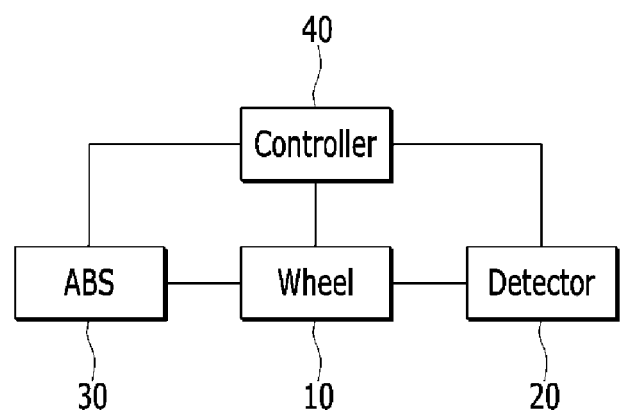
FIG. 2 is a block diagram illustrating an exemplary brake apparatus of a vehicle according to the present invention.

FIG. 2 is a block diagram illustrating a brake apparatus of a vehicle according to various embodiments of the present invention.

As shown in FIG. 2, a brake apparatus of a vehicle according to various embodiments of the present invention includes a detector 20 detecting driving information of the vehicle, an antilock brake system (ABS) 30 controlling a braking force supplied to wheels 10 provided to the vehicle by detecting slip generated at the wheels 10, and a controller 40 determining a braking status of the vehicle from the driving information detected by the detector 20 and selectively performing ABS control or pitch motion control for reducing pitch motion of the vehicle.

The detector 20 detects overall driving information including an operation status of a brake pedal, a vehicle speed, and a vehicle deceleration, and the detected driving information is supplied to the controller 40.

The operation status of the brake pedal by a driver may be detected by a brake pedal sensor provided in the vehicle. The vehicle speed may be detected by a wheel speed sensor provided in the wheel 10 of the vehicle. The vehicle deceleration may be detected by an acceleration sensor provided in the wheel 10, or calculated by differentiating the wheel speed detected by the wheel speed sensor.

The controller 40 may be implemented by one or more processors operated by a predetermined program, in which the predetermined program is set to perform steps of a braking method of a vehicle according to various embodiments of the present invention The controller 40 determines whether the vehicle quickly brakes according to the operation status of the brake pedal and the vehicle deceleration. For example, the controller 40 may determine that the vehicle quickly brakes when the brake pedal is operated and the vehicle deceleration is greater than a predetermined deceleration.

The controller 40 calculates a pitch coefficient from the vehicle speed and a variation of the vehicle deceleration. The pitch coefficient quantitatively determines a phenomenon of the pitch motion. The pitch coefficient is stored in the controller 40 as map data according to the vehicle speed and the vehicle deceleration.

When the pitch coefficient is greater than a first predetermined value, the controller 40 performs pitch motion control.

The pitch motion control is a method in which a braking force supplied to the wheels 10 of the vehicle is limited in order to prevent the pitch motion. In detail, the pitch motion control supplies a predetermined braking force to the wheel 10 for a predetermined time, and increases the braking force supplied to the wheel 10 step-by-step until the pitch coefficient becomes less than a second predetermined value.

When the pitch coefficient is less than a second predetermined value, the controller 40 stops the pitch motion control, and when a slip occurs at the wheel 10, the controller 20 performs ABS control.

Hereinafter, a braking method of a vehicle according to various embodiments of the present invention will be described in detail with reference to accompanying drawings.

Figure 3:
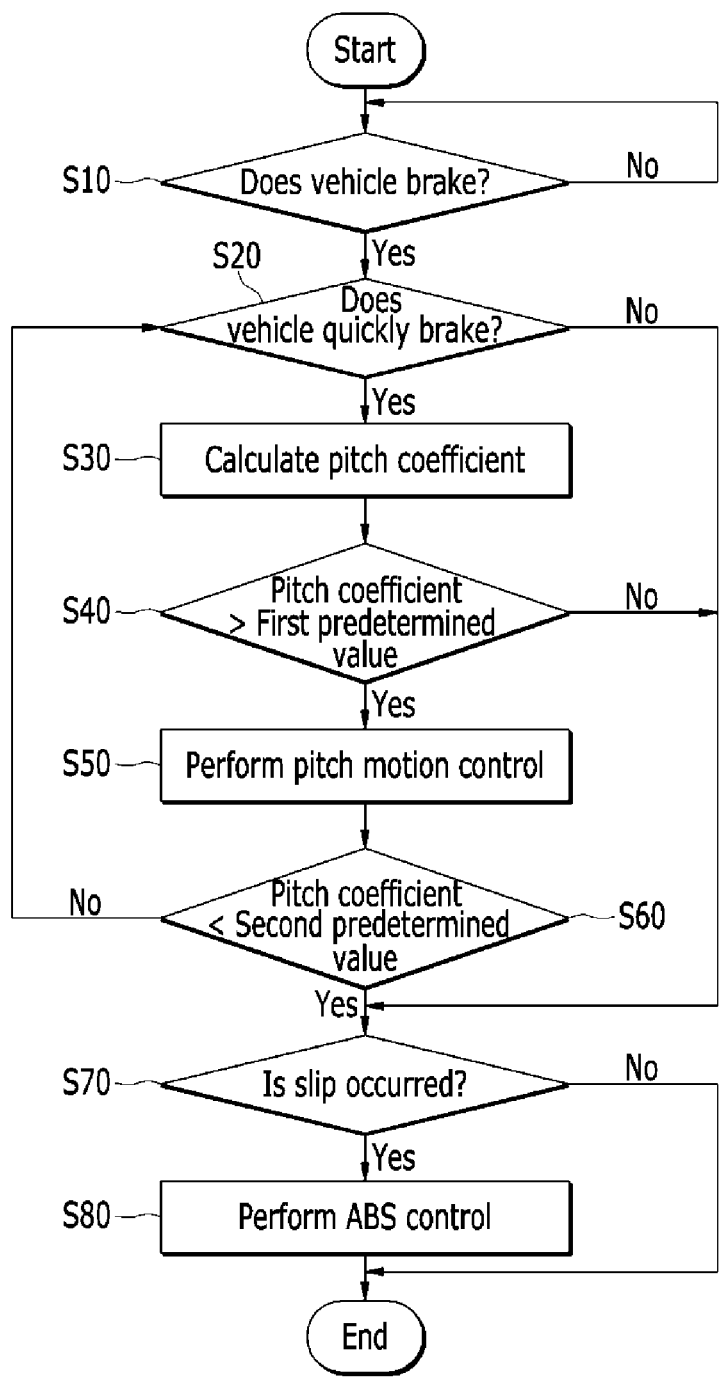
FIG. 3 is a flowchart illustrating an exemplary braking method of a vehicle according to the present invention.
Figure 4:
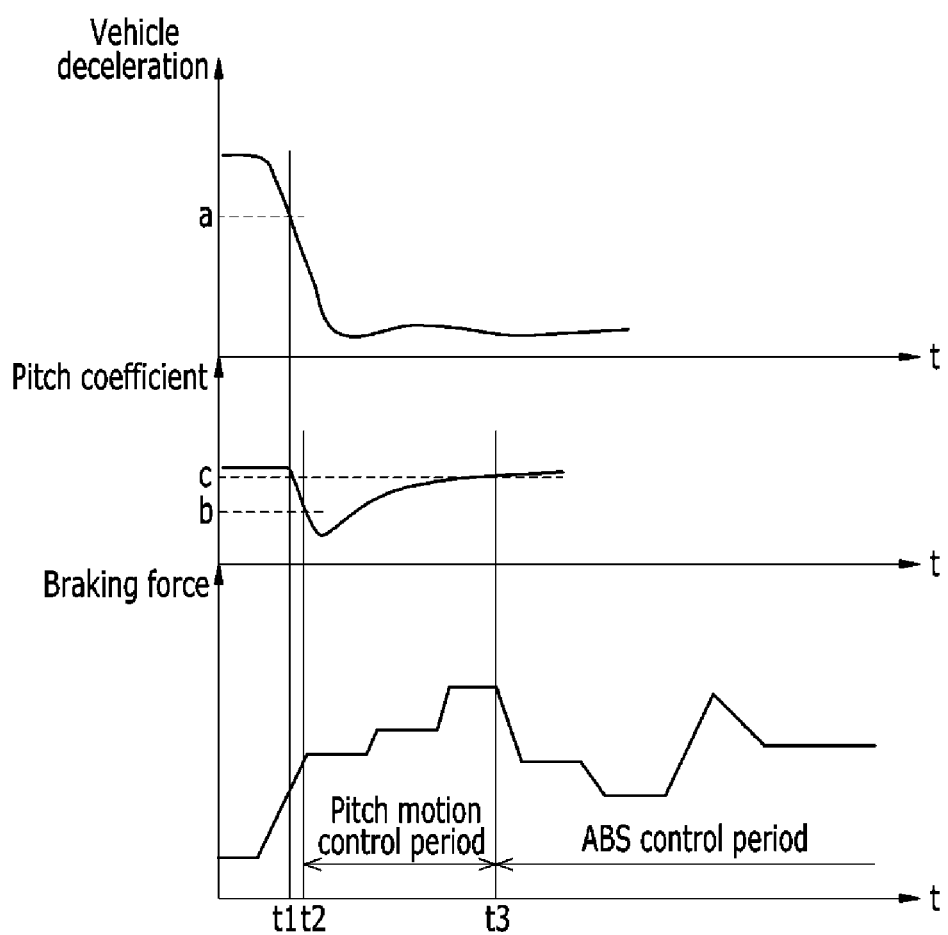
FIG. 4 is a graph illustrating a relationship among a vehicle deceleration, a pitch coefficient, and a braking force.

FIG. 3 is a flowchart illustrating a braking method of a vehicle according to various embodiments of the present invention. FIG. 4 is a graph illustrating a relationship among a vehicle deceleration, a pitch coefficient, and braking force.

Referring to FIG. 3 and FIG. 4, the controller 40 determines whether the vehicle brakes through the detector 20 at step S10.

It is possible to determine whether the vehicle brakes by a signal transferred from a brake pedal sensor.

When the vehicle brakes, the controller 40 determines whether the vehicle quickly brakes by a vehicle deceleration detected by the detector 20 at step S20. At this time, the controller 40 may determine that the vehicle quickly brakes (refer to 't1' of FIG. 4) when the deceleration of the vehicle is greater than a predetermined deceleration (refer to 'a' of FIG. 4).

The controller 40 calculates a pitch coefficient at step S30. As described above, the pitch coefficient may be stored as map data according to the vehicle speed and vehicle deceleration.

When the pitch coefficient is greater than a first predetermined value (refer to 'b' FIG. 4), the controller 40 determines that the pitch motion has occurred, and performs the pitch motion control from a 't2' time at step S50.

In detail, the controller 40 supplies a predetermined braking force to the wheel 10 for a predetermined time.

When the pitch coefficient is greater than the second predetermined value, the controller 40 increases the braking force supplied to the wheel 10 step-by-step. When the pitch coefficient is less than the second predetermined value, it means that the pitch motion has not occurred. At this time, the second predetermined value is set to be less than the first predetermined value.

In other words, the controller 40 increases the braking force supplied to the wheel 10 step-by-step from when the pitch coefficient is the first predetermined value (refer to 'b' and 't2' of FIG. 4) to when the pitch coefficient become less than the second predetermined value (refer to 'c' and 't3' of FIG. 4).

That is, the controller 40 starts the pitch motion control when the pitch coefficient is greater than the first predetermined value, and performs the pitch motion control until the pitch coefficient becomes less than the second predetermined value (refer to 'pitch motion control period' of FIG. 4).

When the pitch coefficient is less than the second predetermined value at step S60, the controller 40 stops the pitch motion control.

The controller 40 detects a wheel status of the vehicle through the detector 20. When a slip has occurred at the wheel 10 at step S70, the controller performs ABS control in order to prevent wheel slip and locking up of the brake at step S80.

Hereinafter, the braking method of the vehicle according to various embodiments of the present invention will be described by comparing it to a braking method according to conventional art. The braking method according to the conventional art means the ABS control only.

Figure 5:
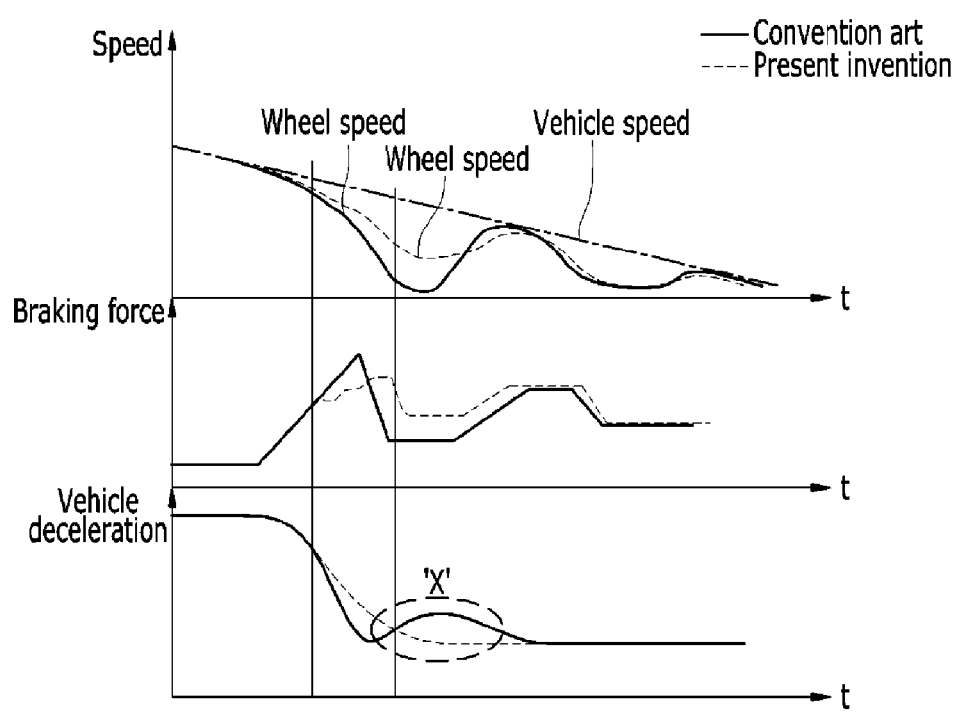
FIG. 5 is a graph illustrating a relationship among a vehicle speed, a braking force, and a vehicle deceleration.

FIG. 5 is a graph illustrating a relationship among a vehicle speed, a braking force, and a vehicle deceleration.

As shown in FIG. 5, if only the ABS control is performed when the vehicle speed is quickly decreased, a high braking force is supplied to the wheel 10 and then the braking force is quickly decreased. That is, the wheel speed is quickly decreased and then quickly increased. The vehicle deceleration is increased and then decreased (refer to 'x' of FIG. 5), and the braking distance of the vehicle is increased.

However, since the braking method according to the present invention limits the braking force supplied to the wheel 10 through the pitch motion control before the ABS control is performed, the vehicle deceleration is reduced and the braking distance is not increased.

As described above, according to various embodiments of the present invention, when the vehicle quickly brakes and the pitch coefficient is greater than the first predetermined value, the controller determines that the pitch motion has occurred and performs the pitch motion control.

When the braking force supplied to the wheel 10 is increased step-by-step through the pitch motion control, it is possible to prevent losing the vehicle deceleration comparing to the conventional art.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A brake apparatus of a vehicle comprising:
a detector configured to detect driving information including an operation status of a brake pedal, a vehicle speed, and a vehicle deceleration;
an anti-lock braking system (ABS) configured to control a braking force supplied to wheels of the vehicle by detecting slip generated at the wheels; and
a controller configured to determine a braking status of the vehicle from the operation status of the brake pedal detected by the detector, the vehicle speed, and the vehicle deceleration, and configured to selectively perform ABS control or pitch motion control for reducing a pitch motion of the vehicle according to the braking status of the vehicle,
wherein the controller is configured to perform the pitch motion control when the vehicle deceleration detected by the detector is greater than a predetermined deceleration, and a pitch coefficient determined by the vehicle speed and a variation of the vehicle deceleration is greater than a first predetermined value.

2. The brake apparatus of the vehicle of claim 1,
wherein the controller is configured to stop the pitch motion control when the pitch coefficient is less than a second predetermined value, and performs the ABS control.

3. The brake apparatus of the vehicle of claim 1,
wherein the pitch motion control gradationally increases the braking force supplied to the wheels according to the pitch coefficient after supplying the braking force to the wheels for a period of time.

4. A braking method of a vehicle, comprising: determining, by a detector, driving information including a vehicle speed, and a vehicle deceleration;
determining, by a controller, whether the vehicle brakes;
determining, by the controller, whether the vehicle quickly brakes;
determining, by the controller, a pitch coefficient from the vehicle speed and the vehicle deceleration;
determining, by the controller, whether the vehicle quickly brakes and whether the pitch coefficient is greater than a predetermined value; and
performing, by the controller, pitch motion control in which a predetermined braking force is supplied to the wheel for a predetermined time and the braking force is increased step-by-step when the vehicle quickly brakes and when the pitch coefficient is greater than the predetermined value,
wherein the controller is configured to perform the pitch motion control when the vehicle deceleration detected by the detector is greater than a predetermined deceleration, and the pitch coefficient determined by the vehicle speed and a variation of the vehicle deceleration is greater than a first predetermined value.

5. The braking method of the vehicle of claim 4,
wherein it is determined that the vehicle quickly brakes when the vehicle deceleration is greater than a predetermined deceleration.

6. The braking method of the vehicle of claim 4,
wherein the pitch coefficient is stored as map data according to the vehicle speed and the vehicle deceleration.

7. The brake method of the vehicle of claim 4,
wherein the pitch motion control is stopped and ABS control is performed when the pitch coefficient is less than a second predetermined value.

\* \* \* \* \*